No. 860,140. PATENTED JULY 16, 1907.
H. A. JONES.
METHOD OF MANUFACTURING TATTOOING DIES.
APPLICATION FILED JULY 12, 1906.
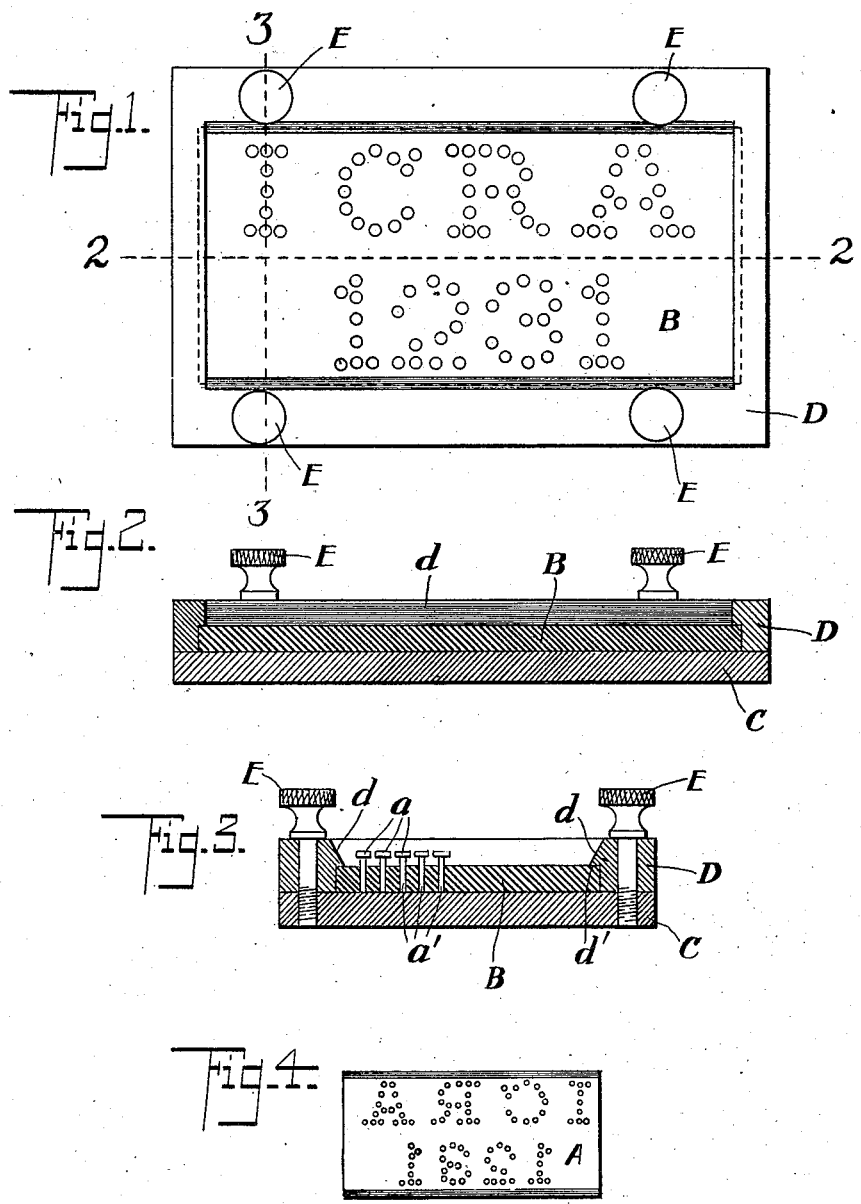

UNITED STATES PATENT OFFICE.

HERBERT A. JONES, OF HIMRODS, NEW YORK.

METHOD OF MANUFACTURING TATTOOING-DIES.

No. 860,140.  Specification of Letters Patent.  Patented July 16, 1907.

Application filed July 12, 1906. Serial No. 325,931.

*To all whom it may concern:*

Be it known that I, HERBERT A. JONES, a citizen of the United States, and a resident of Himrods, in the county of Yates and State of New York, have invented certain new and useful Improvements in Methods of Manufacturing Tattooing-Dies, of which the following is a specification.

This invention relates to a method of manufacturing tattooing dies.

In the drawings: Figure 1 is an enlarged view of a device adapted to carry out this method; Fig. 2 is a longitudinal section on the line 2—2 of Fig. 1; Fig. 3 is a cross section on the line 3—3 of Fig. 1; and Fig. 4 is a plan view of a completed die.

As shown most clearly in Fig. 4, the die is made of a base A of suitable metal, such as type metal, and a series of pins having enlarged heads $a$ set in said type metal, and shanks $a'$ extending therefrom to equal distances from the surface of the type metal A. This die when used in a suitable instrument and with suitable pigment upon the ends of the pins will impress a pattern such as that shown in Fig. 4 into the skin, and with proper pigment the pattern will remain visible.

A pattern block B is employed, having in it a series of holes similar to those shown in Fig. 1; and in each hole is placed one of the pins so as to project from the surface substantially as shown in Fig. 3. The pin is cut a little longer than the thickness of the block B. Then the block with the pins in it is placed upon a base block C, and upon the base block is placed the rim D, having the inwardly inclined faces $d$ and the lip $d'$ projecting over the upper edge of the pattern block B. The rim D and the base block C are then fastened together as by suitable thumb screws E. The parts when in this position force heads $a$ of the pins upward into the space over the pattern block B, and if now a suitable metal, such as type metal, is poured into the cavity surrounded by the rim D the ends of the pins and their heads $a$ will be solidly cast into the metal block thus formed, the shank $a'$ of the pins will project and will produce a tattooing die such as is shown in Fig. 4.

Of course the die may be used to puncture the skin and then the ink may be rubbed into the puncture.

It is clear that the shanks $a'$ must fill the perforations in the plate B, and it is also clear that the heads $a$ should be so large as not to allow the pins to pass through said perforations, since the setting of the pins in the perforated pattern blocks may be done before said blocks are placed in the frame of the mold. The ends of the pins are flat and at right angles to the axes of the shanks, so as to carry ink for the tattooing process. When a pattern block having pins in all its perforations is placed upon the base block C, (and of course the length of the shanks of the pins has been properly adjusted to the thickness of the block B) the heads $a$ will project up into the space into which the metal is to be cast. It is, of course, not material that the heads should lie in the same plane, but it is material that the ends of the shanks should be in the same plane. This accuracy of setting is produced by this method.

What I claim is:

1. The method of making tattooing dies, consisting in arranging a series of pins in perforations in a suitable pattern block, the said pins being longer than the thickness of said block, setting the said block in a mold having a flat base block, whereby the plane of the ends of the pins is determined, and casting metal about the heads of the pins and upon said pattern block, whereby the shanks project a predetermined distance from the surface of said metal.

2. The method of making tattooing dies, consisting in arranging a series of pins having enlarged heads in perforations in a suitable pattern block, the said pins being longer than the thickness of said block, setting the said block in a mold having a flat base block, whereby the plane of the ends of the pins is determined, and casting metal about the heads of the pins and upon said pattern block, whereby the shanks project a predetermined distance from the surface of said metal.

HERBERT A. JONES.

Witnesses:
 FRANK R. DURRY,
 SPENCER F. LINCOLN.